United States Patent
Blayney et al.

(10) Patent No.: US 10,187,605 B2
(45) Date of Patent: *Jan. 22, 2019

(54) BROADCASTING/TRANSMISSION AND DETECTION SYSTEM AND METHOD

(71) Applicants: W. Eric Blayney, Humble, TX (US); Christopher Seckel, Kingwood, TX (US)

(72) Inventors: W. Eric Blayney, Humble, TX (US); Christopher Seckel, Kingwood, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/133,635

(22) Filed: Apr. 20, 2016

(65) Prior Publication Data

US 2016/0241831 A1 Aug. 18, 2016

Related U.S. Application Data

(63) Continuation-in-part of application No. 13/969,299, filed on Aug. 16, 2013, now Pat. No. 9,325,958.

(60) Provisional application No. 61/683,821, filed on Aug. 16, 2012.

(51) Int. Cl.
| | |
|---|---|
| H04N 5/783 | (2006.01) |
| H04N 5/93 | (2006.01) |
| H04N 5/92 | (2006.01) |
| H04N 5/76 | (2006.01) |
| H04N 9/82 | (2006.01) |
| G11B 27/00 | (2006.01) |
| H04N 7/025 | (2006.01) |

(52) U.S. Cl.
CPC .......... *H04N 5/783* (2013.01); *G11B 27/005* (2013.01); *H04N 5/76* (2013.01); *H04N 9/8205* (2013.01)

(58) Field of Classification Search
CPC  H04N 5/783; H04N 5/93; H04N 5/92; H04N 7/10; H04N 7/025
USPC ....... 386/343, 345, 346, 347, 348, 349, 350, 386/351, 352, 353, 326; 725/32
See application file for complete search history.

(56) References Cited

U.S. PATENT DOCUMENTS

| | | | |
|---|---|---|---|
| 2004/0034874 A1* | 2/2004 | Hord ........................ | H04N 5/76 725/136 |
| 2005/0002644 A1* | 1/2005 | Nakamura ............. | G11B 27/28 386/250 |
| 2010/0218208 A1* | 8/2010 | Holden .................. | G11B 27/00 725/32 |

* cited by examiner

Primary Examiner — Daquan Zhao
(74) Attorney, Agent, or Firm — Bushman Werner, P.C.

(57) ABSTRACT

A system and method is provided for transmitting and displaying video frames or groups of video frames of program content. A program content processor is utilized with an added material processor to insert added material to a limited number of the video frames or groups of video frames of the program content. A broadcasting/transmission device configured to transmit the program content with the added material to a plurality of users who can selectively receive the program content. A controller operable for selectively controlling a speed of the playback of the program content so that the added material becomes readily discernible by the user. An electronic response device is utilized by the user to respond to the now user discernible added material.

15 Claims, 1 Drawing Sheet

BROADCASTING/TRANSMISSION AND DETECTION SYSTEM AND METHOD

CROSS REFERENCE TO OTHER PATENT APPLICATIONS

This application is a continuation in part of U.S. patent application Ser. No. 13/969,299 filed on Aug. 16, 2013, which claims benefit of U.S. provisional application 61/683,821, filed on Aug. 16, 2012.

BACKGROUND OF THE INVENTION

(1) Field of the Invention

The present invention relates generally to television and/or digital transmission and, more particularly, to a method for embedding and detecting information utilizing, in one embodiment, a digital video player or recorder or other digital device operable for inspecting individual frames or groups of frames for the embedded information.

(2) Description of the Prior Art

The common use of a digital video player or recorder or other digital device by consumers viewing television or digital transmission program content broadcasts permits consumers more freedom with control of the video content by being able to review or record and then play back the program content at a convenient time.

While this has many benefits, in some cases there are concerns by advertisers, program content providers, or others as to obtaining the attention of consumers.

Presently, options to increase the attention of consumers is largely a matter of program content. The present invention provides an improved manner of directing the attention of consumers without the need to change the underlying program content. Accordingly, those of skill in the art will appreciate the present invention which addresses the above and other concerns.

SUMMARY OF THE INVENTION

Accordingly, it is an object of the present invention to provide an embedding/display system and techniques for television or digital transmission programming.

Another object of the present invention is to provide means for advertisers, other program content providers, and the like, to provide added and/or relatively hidden material which may or may not be related to the underlying program content, which added information may or may not be actually or practically viewable or discernible without use of a digital video recorder or other digital device, i.e., in real time.

In accordance with one possible embodiment of the present invention, a system for broadcasting such as digital streaming and display is provided comprising a program content processor operable to produce program content. An added material processor is operable to add material to a limited number of frames or groups of frames in the program content. A broadcasting or digital transmission device is operable for broadcasting/transmitting the program content with the added material. Broadcast/transmission devices may include without limitation digital broadcasts such as television, Internet, cellular telephone, or other digital streaming. A digital video player, recorder, or other digital device is selectively operable for receiving, recording and/or playback of the program content on at least one of a display, smart phone, digital tablet, e-reader, personal computer, video game console monitor, sound output, television, monitor, or the like. A controller of any suitable type is operable for use by a user for limiting a speed of the playback of the program content and/or for stopping and/or replaying the program content. It will be appreciated that the controller may be a separate device or program from the digital video device or it may be included within the digital video device. The digital video recorder or other digital device is operable to produce images and/or sounds which may not be readily discernible without use of the controller which cam limit the speed of playback of the program content, stop the playback, and/or replay the program content. The added material may comprise hidden clues, which can be detected or discerned by a user who utilizes the controller to view the frames more slowly, to stop the frames, and/or to replay all or some of the frames, and then operates a response device, which may include the same digital device, e.g. smart phone, digital tablet, computer, or the like to make a response to the hidden clues.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DETAILED DESCRIPTION OF THE INVENTION

Figure 1:
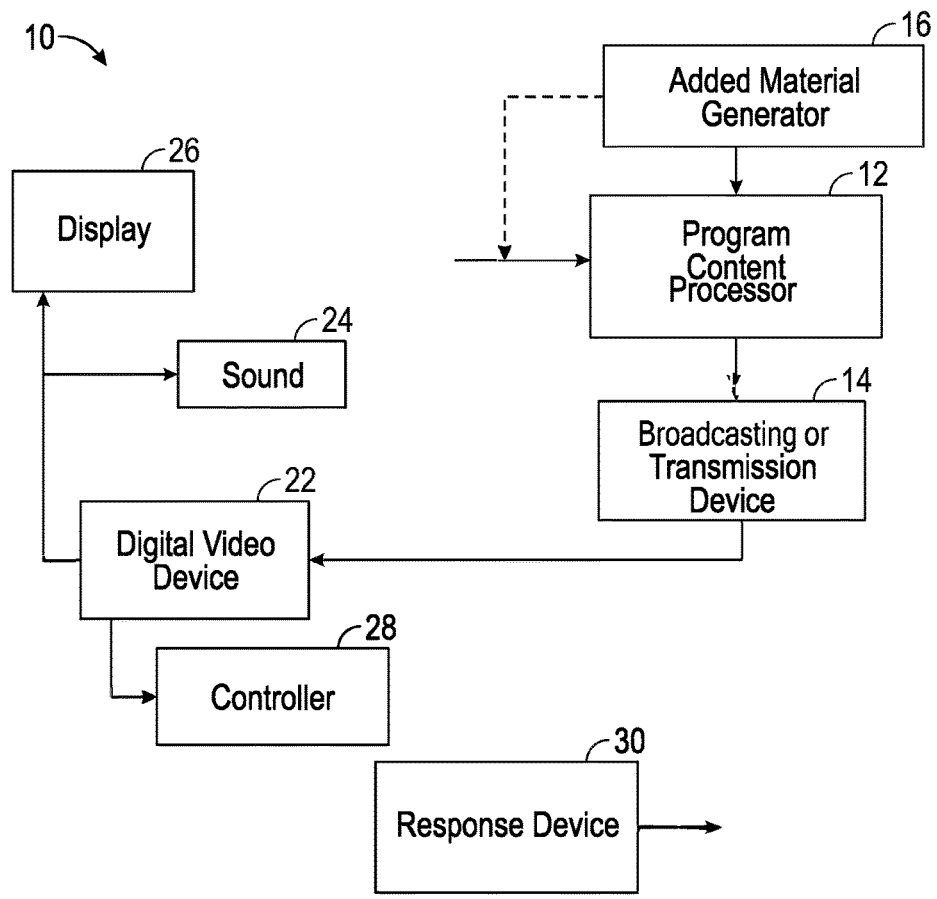
FIG. 1 is a simplified block diagram for a system to include and detect added information in accord with one possible embodiment of the invention.

Referring now to the drawings, and more particularly to FIG. 1, there is shown system 10, which may be utilized to provide additional entertaining content to a user in accord with one possible embodiment of the invention.

Program content processor 12 prepares program content for transmitting by broadcast/transmission device 14. Transmission device 14 may be any device used to disseminate digital data. Program content is created in the standard way utilizing cameras, computer simulations, and the like. Program content may be considered as any content that would be broadcast by any content provider including cable companies, satellite companies, over the air broadcasting, Internet broadcasting, digital streaming, digital transmission, digital broadcasting through any medium, online games, smartphone applications or games, and the like. In one possible embodiment, commercials are considered to be a special type of program content wherein material is added to particular frame(s). This added material is not readily viewable or discernible by the user when viewed at normal frame rates or in real time but becomes visible or discernible when the frame rate is slowed down or stopped. Program content processor 12 and transmission device 14 may comprise many devices, combinations, systems, programs and the like operating or being operated at different locations and/or being configured in many different ways. Transmission device 14 may comprise any of the type of devices utilized for broadcasting/transmitting as described above including without limitation digital/Internet devices, computers, transmitters, wireless transmitters, optical transmitters, cable transmitters, uploading to websites, servers, smartphones, video game consoles, and the like.

At any point in the process of creating program content, either during the creation or afterwards, added material generator or processor 16 may be utilized to insert the added material into the program content. In one possible embodiment, added material generator or processor 16 may be utilized to insert or effectively hide added material into a limited number of frames. Added material generator 16 may comprise many different machines or devices or systems or configurations including editing software, digital computers, servers, programmable devices, and the like.

Figure 2:
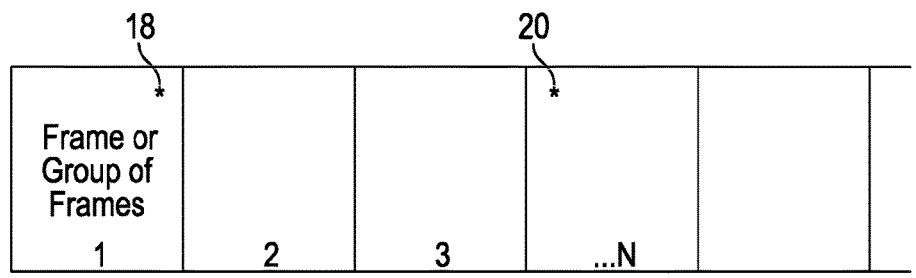
FIG. 2 is a conceptual diagram showing video broadcast frames, some of which include added information which may not be readily discernible during normal speed e.g., real time, 30-200 frames per second (FPS), viewing of the underlying content in accord with one possible embodiment of the present invention.

FIG. 2 provides a simplified example of the added material 18 and 20, which is placed in selected frames or groups of frames. The frames or groups of frames include program content. To this program content, additional information is inserted. In this case, added material 18 is provided in frame or group of frames 1, which also includes program content. Frame or group of frames 2 has only the program content. Frame or group of frames N includes program content as well as added material 20. It will be appreciated that there are many frames and that added material 18 and 20 are placed in only selected of the frames or groups of frames. By frames it is meant pictures that are shown for only a very short time, which may be like frames in movie films or the like. In order for the human eye to detect information in the frame, it must be visible for a certain amount of time and if not then the information is not readily visible or discernible by a user. In one possible embodiment, the present invention can take advantage of this fact to effectively hide information or added material in certain frames or groups of frames. The standard frame rates for phase alternating line (PAL) television is 50 interlaced frames per second (FPS). Generally, depending on the media, standard frame rates would be in a range of from about 30 to 200 FPS. For example, video games with gaming monitors may operate at 120 FPS or higher. Standard frame rates of broadcast devices, cameras, and the like are sometimes referred to herein as real time viewing, which depends on the particular device and broadcasts/transmissions. Thus, real time viewing constitutes viewing the material at the frame rate it is intended to be viewed at, without slowing or stopping the display. The exact frame rate for a transmission being viewed in real time can vary depending on the particular device. The real time viewing can then be slowed or stopped by controller 28 utilizing digital video viewing device 22 as discussed herein.

Added material 18 and added material 20 may typically comprise added visual information and/or added sound information. As discussed hereinafter, in one possible preferred embodiment, the added information is not readily, easily, or perhaps not realistically discernible by a user unless the frame rate is slowed down and/or stopped during display or playback. In another embodiment, some of the added information may be readily discernible but other information may not be readily discernible. For example a clue might be visible but not other information.

In still another embodiment, the added information may be inconspicuous, meaning it is not easily noticed but it is discernible in real time. In another embodiment, information may be viewed very briefly so as to be barely discernible.

Digital video recorder or other digital video viewing device 22 is utilized to receive visual and sound information of any type produced by digital data broadcasting/transmission device 14. Digital video device 22 provides this information to sound output 24 and display 26. The receiving of visual and sound information can comprise streaming the information through the Internet, accessing the information through an application, recording and storing the information, or the like. The received information does not need to be stored or kept on the digital video device 22 to be considered within the scope of the present invention.

Controller 28 is utilized by the user for controlling the output of digital video recorder or other digital video device 22, especially to control the speed or frame rate of the display. In one possible embodiment, the controller 28 is utilized by the user to locate added information such as added material 18 and/or 20 (See FIG. 2) by slowing down or stopping the frame rate so that the information becomes visible. The controller 28 can also be used to replay all or some of the program content.

In one embodiment, added material 18 and added material 20 may comprise visual information that is detected by the user and then combined in some way. For example, added material 18 and added material 20 together may comprise a visual clue that has value of some type to the user once detected. The value may be of various forms such as entertainment value, prizes, discounts, and the like.

For example, the added material may be added within a commercial so that detecting the clues becomes a treasure hunt of some type. This may be in the form of special offers, gifts, benefits, or the like. Advertisers may be motivated to provide this type of content to advertising program information to increase attention to the underlying advertisements, which the user will watch in order to detect the clues, or the like. The new material may be separate from the other program content, responsive to questions asked during a commercial and/or may be used with or require a response. For example, response device 30 may be used in conjunction with controller 28 to respond to the added material detected by a user. Response device 30 may comprise digital devices, smart phones, digital tablets, e-readers, personal computers, video game controllers, remote controls, etc. In some cases, the same digital video device 22 itself may be used as response device 30.

For the above example, in one embodiment the added material processor 16 may be used to place the added material, e.g., a clue or clues, in a very limited number of frames such that by going slowly, stopping, reversing, displaying at different speeds including fast and slow speeds and/or combinations of the above, the material becomes discernible by the user. As another possibility, added material may be filmed into the program content as the program is produced, such as by insertion and removal of certain props or the like during filming and/or cutting.

The added material might be visual or auditory. For example, background sounds may contain information that may not be readily discernible unless it is possible to slow down, stop, and/or replay the program material.

In another embodiment, new material 18 and 20 might be added to cartoons or the like to provide various games, for children and/or adults entertainment. The new material may be in a very limited number of frames or may be provided in many different frames.

As only one possible example of operation, a treasure hunt game may be provided which requires users to search through a commercial by slowing the frame rate speed, stopping the display to inspect the picture, reversing, replaying, and the like, to find hidden added information 18 and 20. In this example, the information is hidden because the typical human eye cannot discern the added information at real time frame rates, requiring use of the digital video recorder or other digital device and speed controls to view the otherwise hidden information. After the hidden added information is detected, response device 30 may be utilized by the user to communicate that the information was detected and thereby obtain a reward or "treasure". Prizes and/or other benefits may be provided to users who are able to locate, detect and decipher the added information 18 and 20. There may be time limitations for providing responses and so forth.

In another embodiment, the present invention may be conducted in a real time manner in the sense that the added material, e.g., clue(s), is inconspicuous and can and/or must be detected at the time the program content is being broadcast/transmitted. Thus, in one embodiment, the present invention would not necessarily require a digital video recorder or other digital device and/or a controller albeit it would require the use of some or all of the components set forth in FIG. 1. Thus, by using one embodiment of the present invention, during the real time broadcasting/transmission of the program content, the advertiser could be assured that when a commercial is on as part of the overall program content, the viewer would remain watching the program content while the commercial is being played. This would be especially true if the answer/response had to be submitted as soon as the embedded material was detected.

In still another embodiment of the present invention, the added material, e.g., the clues, could be incorporated into the programming such that some clues would be inconspicuous but could be readily detected in real time whereas others would require closer examination of the content, e.g., by use of a digital video recorder or other digital device. Accordingly, the game could be set up such that the clues detected in real time would yield an answer(s) entitled to one type of reward whereas the clues which, because of their brief nature in the programming, would require a digital video recorder or other digital device, to yield an answer(s) entitled to a different reward. It will be apparent that numerous combinations, permutations and the like can be made between real time viewing, recorded viewing, the type of clues, the presentation of the clues, etc. to provide an almost endless list of possibilities to maximize the viewer's attention to the programming content, particularly the commercials.

It will be understood that many additional changes in the details, materials, steps and arrangement of parts, which have been herein described and illustrated in order to explain the nature of the invention, may be made by those skilled in the art within the principle and scope of the invention.

Accordingly, the foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention.

The invention claimed is:

1. A system for transmitting video frames or groups of video frames of program content and for user display of said video frames or groups of video frames of program content by a plurality of users, comprising:

an added material processor configured to insert added material into a limited number of said video frames or groups of video frames of said program content whereby said added material is displayed but inconspicuous or indiscernible by said plurality of users when said video frames or groups of video frames containing said added material are played at a normal viewing speed;

a transmission device configured to transmit said program content with said added material to said plurality of users who can selectively receive said program content;

a plurality of digital video devices selectively operable by respective of said plurality of users for receiving and playback of said program content; and a plurality of controllers operable by said plurality of users for selectively controlling a speed of said playback of said program content, wherein by controlling said speed of said playback for selected of said video frames or groups of video frames said added material becomes user discernible.

2. The system of claim 1, further comprising a plurality of response devices configured for responding to said added material by sending corresponding electronic signals to at least one designated receiver.

3. The system of claim 2, wherein said plurality of response devices further comprise said plurality of digital devices which have been additionally programmed to act as said plurality of response devices.

4. The system of claim 1, wherein said added material processor is operable to hide said added material within said program content by controlling insertion of said added material to a limited number of said video frames or groups of video frames of program content, whereby said added material is indiscernible until said program content is replayed at a playback speed that is different than said normal viewing speed.

5. The system of claim 1, wherein said added material processor is operable to hide said added material within said program content by controlling insertion of said added material to a limited number of said video frames or groups of video frames of program content, whereby said added material becomes user discernible when said program content is stopped at a selectable video frame.

6. The system of claim 1, wherein said added material comprises at least one of visual or auditory information.

7. A method for transmitting video frames or groups of video frames of program content and displaying said video frames or groups of video frames of program content by a plurality of users, comprising:

inserting added material to a limited number of said video frames or groups of video frames of said program content;

transmitting said program content with said added material;

providing each of said plurality of users with a digital device selectively operable for receiving and playback of said program content whereby said added material is displayed but inconspicuous or indiscernible by said plurality of users when said video frames or groups of video frames containing said added material are played at a normal viewing speed; and providing each of said plurality of users with a controller operable for selectively controlling a speed of said playback of said program content, wherein by controlling said speed of said playback for selected of said video frames or groups of video frames that said added material becomes user discernible.

8. The method of claim 7, further comprising providing each of said plurality of users with a response device operable for responding electronically to said added material by sending an electronic signal to at least one designated receiver.

9. The method of claim 8, wherein said added material comprises at least one of a game or reward and said step of responding electronically is based on game rules or reward rules that require use of at least one of said response device.

10. The method of claim 7, further comprising hiding said added material within said program content by insertion into a limited number of video frames or groups of video frames of program content whereby said added material becomes user discernible when said video frames or groups of video frames of program content is replayed at a different speed than said normal viewing speed.

11. The method of claim 7, further comprising hiding said added material within said program content by insertion into a limited number of video frames or groups of video frames of program content whereby said added material becomes user discernible when said video frames or groups of video frames of program content are stopped at one or more selectable video frames.

12. A method for transmitting video frames or groups of video frames of program content and displaying said video frames or groups of video frames of program content by a plurality of users, comprising:
   inserting added material to a limited number of said video frames or groups of video frames of said program content; and
   transmitting said program content with said added material to a plurality of users whereby said added material is displayed but inconspicuous or indiscernible by said plurality of users when said video frames or groups of video frames containing said added material are played at a normal viewing speed; and
   providing that said added material becomes user discernible by said plurality of users during playback of said program content by controlling a speed of said playback for selected of said video frames or groups of video frames.

13. The method of claim 12, wherein said added material is added during the creation of said program content.

14. The method of claim 12, wherein said added material is added after the creation of said program content.

15. A system for transmitting video frames or groups of video frames of program content and for user display of said video frames or groups of video frames of program content by a plurality of users, comprising:
   an added material processor configured to insert added material into a limited number of said video frames or groups of video frames of said program content whereby said added material is displayed but inconspicuous when said video frames or groups of video frames containing said added material are played at a normal viewing speed;
   a transmission device configured to transmit said program content with said added material to said plurality of users who can selectively receive said program content;
   a plurality of digital video devices selectively operable by respective of said plurality of users for receiving and playback of said program content; and
   a plurality of controllers operable by said plurality of users for selectively controlling a speed of said playback of said program content.

* * * * *